(12) United States Patent
Hashizume

(10) Patent No.: US 8,749,443 B2
(45) Date of Patent: Jun. 10, 2014

(54) WIRELESS TERMINAL DEVICE

(75) Inventor: Takanori Hashizume, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 452 days.

(21) Appl. No.: 13/142,122

(22) PCT Filed: Dec. 25, 2009

(86) PCT No.: PCT/JP2009/071672
§ 371 (c)(1),
(2), (4) Date: Jun. 24, 2011

(87) PCT Pub. No.: WO2010/074262
PCT Pub. Date: Jul. 1, 2010

(65) Prior Publication Data
US 2011/0260942 A1    Oct. 27, 2011

(30) Foreign Application Priority Data
Dec. 25, 2008    (JP) .................................. 2008-331443

(51) Int. Cl.
*H01Q 1/52*    (2006.01)
(52) U.S. Cl.
USPC ........................................ 343/853; 343/702
(58) Field of Classification Search
USPC ........... 343/853, 702, 700 MS, 846, 900, 909
See application file for complete search history.

(56) References Cited

U.S. PATENT DOCUMENTS

| | | | | |
|---|---|---|---|---|
| 6,806,835 | B2 * | 10/2004 | Iwai et al. | 343/702 |
| 8,319,690 | B2 * | 11/2012 | Oh | 343/702 |
| 2010/0022197 | A1 * | 1/2010 | Kato et al. | 455/75 |
| 2010/0150077 | A1 * | 6/2010 | Nanda et al. | 370/328 |
| 2010/0304692 | A1 * | 12/2010 | Lu et al. | 455/77 |

FOREIGN PATENT DOCUMENTS

| | | |
|---|---|---|
| JP | 9-270728 | 10/1997 |
| JP | 2002-246822 | 8/2002 |
| JP | 2003-273767 | 9/2003 |
| JP | 2004-040524 | 2/2004 |
| JP | 2005-033551 | 2/2005 |
| JP | 2005-086632 | 3/2005 |
| JP | 2005-167908 | 6/2005 |
| JP | 2005-192055 | 7/2005 |
| JP | 2006-148517 | 6/2006 |
| JP | 2006-166260 | 6/2006 |
| JP | 2008-136189 | 6/2008 |
| WO | WO 2006-006599 | 1/2006 |
| WO | WO 2008-129882 | 10/2008 |

* cited by examiner

*Primary Examiner* — Thien M Le

(57) ABSTRACT

A first conduction part (12) coated with a conductive paint is formed on a back housing (1CAR) to be attached to one housing of a portable telephone unit at a position near a hinge mechanism (9) which connects the one housing to the other housing of the portable telephone unit. A GPS antenna is disposed on the hinge mechanism (9) side inside the other housing. The first conduction part (12) is in contact with a conductive connection terminal (21). A condenser element (22C) and a coil element (22L) are connected in parallel between the connection terminal (21) and a reference potential line (10G) of a first circuit board (10) disposed inside the aforementioned one housing.

12 Claims, 17 Drawing Sheets

WIRELESS TERMINAL DEVICE

TECHNICAL FIELD

The present invention relates to wireless terminal devices including antennas that correspond to varying frequency bands.

BACKGROUND ART

Wireless terminal devices having wireless functions, such as mobile phones, have technologies with which, by regarding circuit boards inside housings as conductors and by integrating these into some sections of dipole antennas, radiation characteristics of the antennas are improved. For example, in the patent document 1, wireless terminal devices in which, by establishing conductivity with the ground of the respective circuit boards using a connecting section of an upper housing and a lower housing, the full length of the dipole antenna is deployed, and in which the radiation characteristics are improved even in the state in which the housings are open, are disclosed. Moreover, in the patent document 2, it has been disclosed that by electrically connecting the circuit component that is mounted on the lower circuit boards of the lower housing to the circuit component that is mounted on the upper circuit board of the upper housing with flexible cables, the full length of the dipole antenna is deployed.

RELATED ART

Patent Documents

Patent Document 1: Japanese Unexamined Patent Application Publication No. 2005-192055
Patent Document 2: Japanese Unexamined Patent Application Publication No. 2008-136189

DISCLOSURE OF THE INVENTION

Problems to be Solved by the Invention

In recent years, wireless terminal devices, such as mobile phones and PDA (Personal Digital Assistants), are becoming increasingly multifunctional. For example, some mobile phones include a navigation function using global positioning system (GPS) in addition to normal calls and transmitting and receiving e-mails. In order for these types of wireless terminal devices to receive and transmit with a plurality of frequency bands, it is necessary to provide antennas that correspond to varying frequency bands in the housings. Therefore, as per the technologies disclosed in patent documents 1 and 2, if conductive sections that establish conductivity with the ground of the respective circuit boards are provided to the connecting section, resulting from the effect of the conductive section, for one antenna, there is a possibility that sufficient radiation characteristics are not obtained.

The present invention was invented in view of the above aspects, and for wireless terminal devices comprising antennas that correspond to varying frequency bands, an objective of the present invention is to obtain desired radiation characteristics for each antenna.

Means for Solving the Problems

In order to solve the above problems and in order to achieve the objectives, a wireless terminal device according to the present invention comprises: circuit boards that are disposed inside a plurality of housings, respectively; a connecting section that connects the plurality of housings; conductive sections that are provided on the inner side of the respective housings for the connecting section and that transmit high-frequency current; an antenna disposed on the opposite side of the connecting section on an circuit board for a first frequency; an antenna disposed on the connecting section side on the circuit board for a second frequency; a connecting terminal that is disposed on the connecting section side and that comes in touch with the conductive section; a first filter that is provided between the connecting terminal and the reference potential line of the circuit boards and that interferes with the passage of the second frequency band.

In the wireless terminal device, the first filter may comprise at least a capacitor element that is connected in series between the connecting terminal and the reference potential line.

In the wireless terminal device, the first filter may comprise a coil element that is connected in parallel to the capacitor element.

In the wireless terminal device, connecting members having conductivity are provided to the connecting section, the connecting members come in touch with the conductive sections, and the connecting members are connected in parallel to the capacitor element.

The wireless terminal device may comprise a coil element connected in series to the capacitor element.

In the wireless terminal device, the antenna for the second frequency band may be provided to the circuit board that is disposed inside the housing to which an operation means is provided, among the plurality of housings.

In the wireless terminal device, the first frequency band may be 800 MHz band, and the second frequency band may be 1.5 GHz band.

In the wireless terminal device, the antenna for the first frequency band is a transmitting and receiving antenna that is used for wireless communications, and the antenna for the second frequency band is a GPS antenna that is used for reception of the GPS.

In the wireless terminal device, the first filter interferes with the passage of the second frequency band more than with the first frequency band.

The wireless terminal device may further comprise an antenna for a third frequency band, the antenna different from both the first frequency band and the second frequency. In the wireless terminal device, a second filter that is connected in series to the first filter between the connecting terminal and the reference potential line of the circuit boards and that interferes with the passage of the third frequency band is provided.

The wireless terminal device may further comprise a second filter and a communication section. The second filter is connected in series to the first filter between the connecting terminal and the reference potential line of the circuit boards. The second filter interferes with the passage of the third frequency band. The communication section feeds signals of the third frequency to the conductive sections.

Advantage of the Invention

According to the present invention, for wireless terminal devices comprising antennas that correspond to varying frequency bands, desired radiation characteristics can be obtained for each antenna.

EMBODIMENT OF THE INVENTION

The present invention is explained in detail below with reference to the figures. The present invention is not limited to the following embodiments. Moreover, the constituent elements of the following embodiments include those which one skilled in the art can easily assume, which are practically identical, and which are in the so-called a range of equivalence. Below, as mobile terminal devices, mobiles phones are used as an example; however, the present invention can be applied to mobile terminal devices having antennas that correspond to at least 2 types of frequency bands. Therefore, the present invention, as long as they have antennas that correspond to at least 2 types of the frequency bands, can be applied with respect to, for example, PHS, PDA, portable navigation devices, laptops, game machines, etc.

Embodiment

According to the present embodiment, a wireless terminal device comprises: antennas that correspond to at least two types of the frequency bands; circuit boards that are disposed inside a plurality of housings, respectively; conductive sections that are located at the connecting section of the plurality of housings, and that are connected at a high frequency between the reference potential (ground: GND) lines of the respective circuit boards, that is, that transmit the high-frequency current; and a filter that is located between the conductive sections and the reference potential lines, and that interferes more with the passage of a second frequency band than with a first frequency band.

Figure 1:
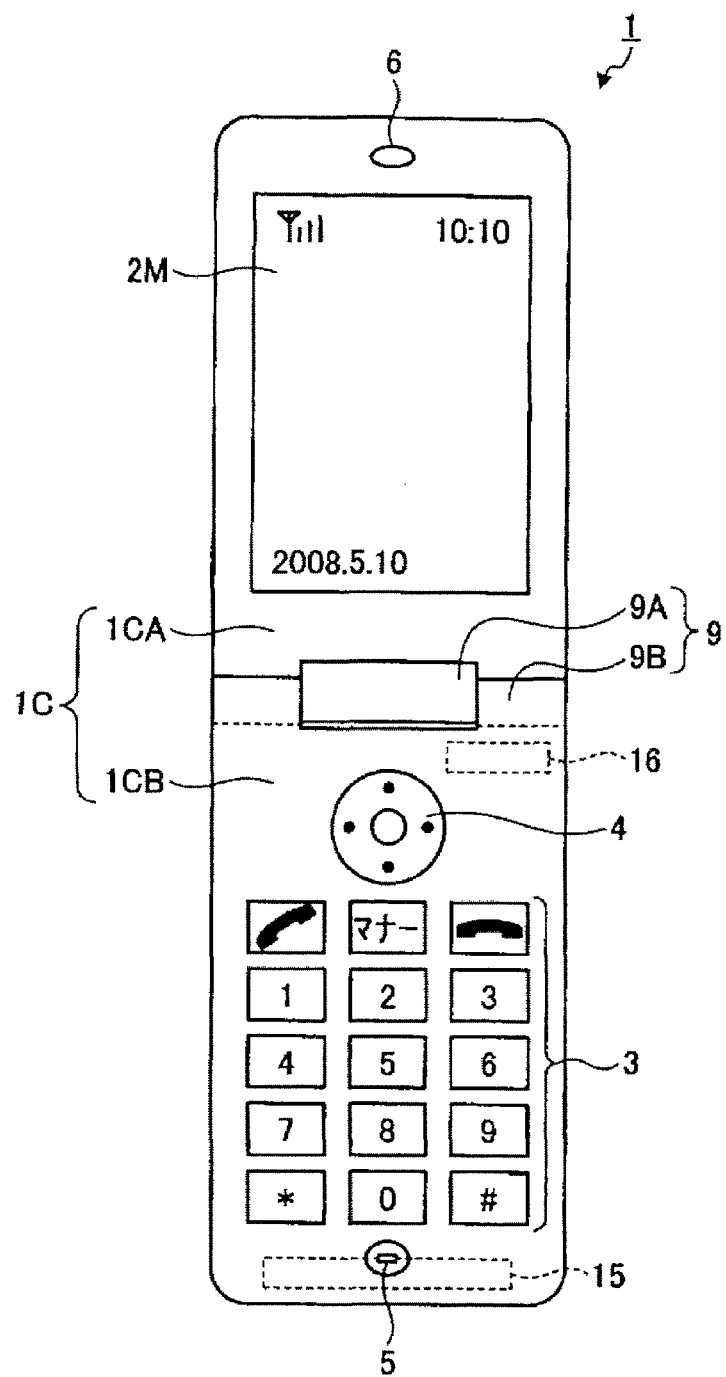
FIG. 1 is a front view of the mobile phone according to the present embodiment.
Figure 2:
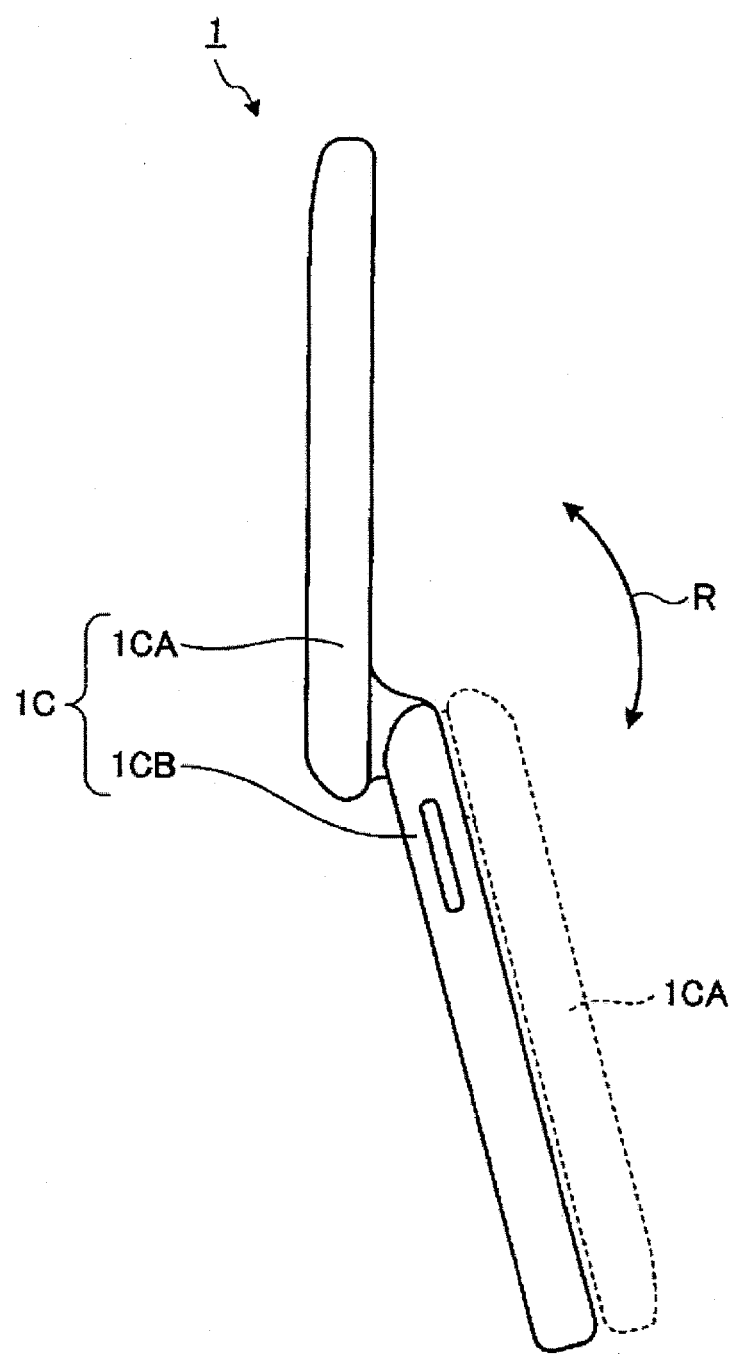
FIG. 2 is a side view of the mobile phone according to the present embodiment.

FIG. 1 is a front view of the mobile phone according to the present embodiment. FIG. 2 is a side view of the mobile phone according to the present embodiment. The wireless terminal device according to the present embodiment is a mobile phone comprising a wireless communication function and a GPS receiving function. For a mobile phone 1 shown in FIGS. 1 and 2, a housing 1C is constituted from the plurality of housings. Specifically, the housing 1C is constituted from a first housing 1CA and a second housing 1CB, so as to be openable and closable. That is, the mobile phone 1 has a folding type housing. The mobile phone 1 may have at least two housings, and those housings are not limited to a folding type. For example, the housings of the mobile phone 1 may be sliding housings, in which in the state in which both housings overlap with each other, one housing and the other housing can be slid with respect to each other, or it may be a rotary type that rotates one housing around the shaft line along the overlapping direction, and it may be a type in which both housings are linked through a 2-axis hinge (swivel mechanism).

The first housing 1CA and the second housing 1CB are connected using a hinge mechanism 9, which is a connecting section. The hinge mechanism 9 is constituted by including a first hinge section 9A on the first housing 1CA side and a second hinge section 9B on the second housing 1CB side. By connecting the first housing 1CA and the second housing 1CB with the hinge mechanism 9, the first housing 1CA and the second housing 1CB rotate around the hinge mechanism 9 and they are constituted such that they can be rotated in the direction in which they leave away from each other and in the direction in which they approach each other (in the direction shown in R in FIG. 2). When the first housing 1CA and the second housing 1CB rotate in the direction in which they leave away from each other, the mobile phone 1 opens, and when the first housing 1CA and the second housing 1CB rotate in the direction in which they approach each other, the mobile phone 1 closes and enters a state in which they are folded (the state shown in dotted lines in FIG. 2).

To the first housing 1CA, as a display section, a display 2M shown in FIG. 1 is provided. The display 2M displays, as a predefined screen, an idle screen (standby screen) in the state in which the mobile phone 1 is awaiting reception and displays a menu screen that is used to assist in the operation of the mobile phone 1. Moreover, to the first housing 1CA, a speaker 6 that emits a sound during calls using the mobile phone 1 is provided. To the second housing 1CB, a plurality of operation keys 3 for inputting telephone numbers of intended parties or for inputting characters when creating e-mails are provided, and a direction and decision key 4 for easily performing selection of the menu that is displayed on the display 2M and for performing scrolling, etc., is provided. The operation keys 3 and the direction and decision key 4 constitute an operation means of the mobile phone 1. In addition, to the second housing 1CB, a microphone 5 that receives the sound during calls using the mobile phone 1 is provided.

Inside the second housing 1CB, a first antenna 15 and a second antenna 16 are provided. The first antenna 15 is a transmitting and receiving antenna that is used for wireless communications, and it is used for transmitting and receiving the electric waves (electromagnetic waves) according to calls, e-mails, etc, between the mobile phone 1 and the base station. The second antenna 16 is a receiving antenna that is used for reception of the GPS, and it is used for the reception of the electric waves (electromagnetic waves) that are sent from the GPS satellite. The first antenna 15 is disposed on the opposite side from the hinge mechanism 9 on the second housing 1CB, and the second antenna 16 is disposed on the hinge mechanism 9 side of the second housing 1CB (in the vicinity of the hinge mechanism 9). The second antenna 16 is not limited to receiving the GPS, and it may be an antenna for receiving the TV broadcasting.

The first antenna 15 is an antenna for the first frequency band, and its target frequency band is 800 MHz band in the present embodiment. The second antenna 16 is an antenna for the second frequency band, and its target frequency band is 1.5 GHz in the present embodiment. The first antenna 15 may subject 2 GHz band. Moreover, the frequency band of the first antenna 15 and the frequency band of the second antenna 16 may be in the band frequency that differs from each other and they are not limited to the above band frequency. Moreover, in the present embodiment, the first antenna 15 is used for both transmitting and receiving, and the second antenna 16 is used for receiving; however, both the first antenna 15 and the second antenna 16 may be used for either transmitting or receiving. Therefore, the second antenna may be a wireless LAN antenna.

Figure 3:
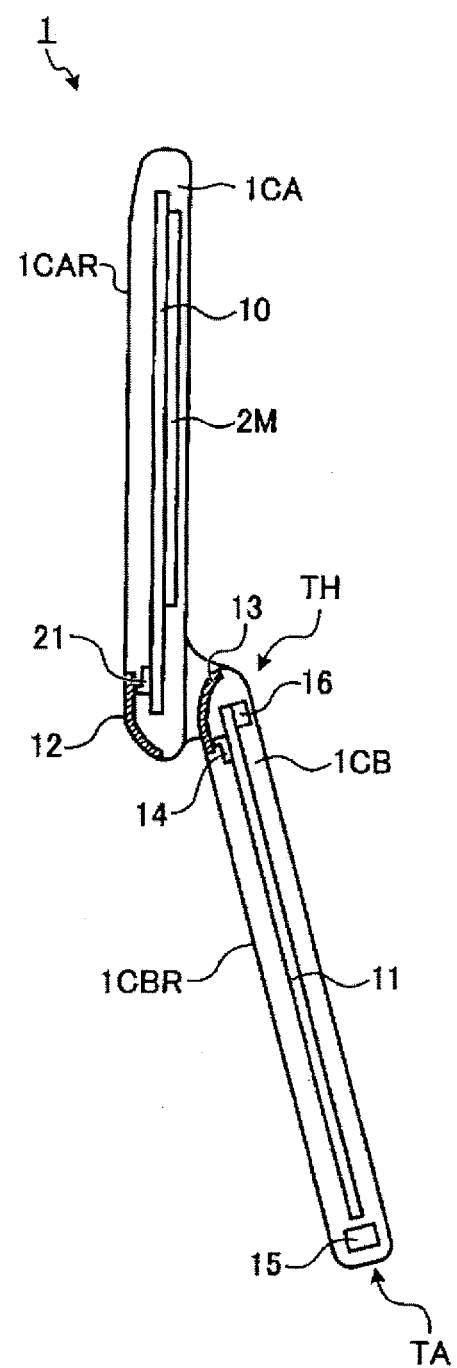
FIG. 3 is a diagram showing the internal configuration of the mobile phone according to the present embodiment.

FIG. 3 is a figure showing the internal configuration of the mobile phone according to the present embodiment. As shown in FIG. 3, inside the first housing 1CA, a circuit board (a first circuit board) 10 is provided. The first housing 1CA is constituted by pasting together two housings from the front side (display surface side of the display) and the back side (rear surface side of the display) and more specifically, it has a back housing 1CAR on the back side. To the first circuit board 10, an electronic circuit for controlling the display 2M is constituted. Inside the second housing 1CB, the circuit board (a second circuit board) 11 is disposed. The second housing 1CB is, as is the case with the first housing 1CA, also constituted by pasting together two housings and a back housing 1CBR is provided to the back side. To the second circuit board 11, an electronic circuit for achieving the communication functions, screen display functions, etc., of the mobile phone 1 is constituted. Specifically, the electronic circuit for achieving the communication functions is connected to the first antenna 15 and performs wireless communications using the first antenna 15.

The first antenna 15 inside the second housing 1CB is disposed on the opposite side (opposite housing connecting section) TA from the hinge mechanism 9 of one circuit board (the second circuit board 11 in the present embodiment), among the plurality of circuit boards that the mobile phone 1 comprises. Moreover, the second antenna 16 inside the second housing 1CB is disposed on the hinge mechanism 9 side (housing connecting section side) TH of the second circuit board 11. Therefore, the first antenna 15 is disposed on the opposite side from the hinge mechanism 9 of the second housing 1CB, and the second antenna 16 is disposed on the hinge mechanism 9 side of the second housing 1CB (in the vicinity of the hinge mechanism 9). As described above, the subjected frequency bands differ between the first antenna 15 and the second antenna 16. Therefore, the first antenna 15 and the second antenna 16 on one circuit board are preferably disposed away from each other from an isolation perspective. In the present embodiment, the second antenna 16 is mounted on the second circuit board 11. Moreover, the first antenna 15 may be mounted on the second circuit board 11.

Inside the first housing 1CA for the connecting section, that is, inside the first housing 1CA for the section to which the hinge mechanism 9 is provided, a conductive section (first conductive section) 12 is provided. Moreover, inside the second housing 1CB for the connecting section, that is, inside the second housing 1CB for the section to which the hinge mechanism 9 is provided, a conductive section (second conductive section) 13 is provided. The first conductive section 12 and the second conductive section 13 have conductivity. The first conductive section 12 and the second conductive section 13 are formed by applying a conductive coating material to the inner side of the first housing 1CA and to the inner side of the second housing 1CB, and by sputtering metals to the inner side of the first housing 1CA and to the inner side of the second housing 1CB.

A connecting terminal 21 comes in contact with the first conductive section 12 and the first conductive section 12 and the reference potential line of the second circuit board 11 are electrically connected through the connecting terminal 21. Moreover, the second conductive section 13 is electrically connected to the reference potential line of the second circuit board 11 through a second conductive section side terminal 14 that is in contact therewith. The connecting terminal 21 and the second conductive section side terminal 14 are both constituted from a material having conductivity, and in the present embodiment, metals are used. Because the first conductive section 12 and the second conductive section 13 are formed in the circumference of the hinge mechanism 9, that is, in the vicinity of the hinge mechanism 9, the first conductive section 12 and the second conductive section 13 are disposed close to each other and disposed so as to oppose each other. Based on this, because the first conductive section 12 and the second conductive section 13 are capacitively-coupled, the reference potential line of the first circuit board 10 and the reference potential line of the second circuit board 11 are connected at a high frequency. Moreover, between the first conductive section 12 and the second conductive section 13, it becomes possible to transmit a high-frequency current. For example, the electric waves that reach the mobile phone 1 by transmitting from the base station through the air are resonated from the first antenna 15 that is provided to the mobile phone 1, and the high-frequency current is induced.

In this way, by providing conductive sections, that is, by providing the first conductive section 12 and the second conductive section 13, in the vicinity of the hinge mechanism 9, the radiation gain of the first antenna 15 can be assured and the performance of the first antenna 15 can be assured. For example, as shown in FIG. 3, in the state in which the first housing 1CA and the second housing 1CB are open, the high-frequency current that is induced by the electric waves that are reached, are transmitted to the first antenna 15, to the second circuit board 11, to the second conductive section side terminal 14, to the second conductive section 13, to the first conductive section 12, to the connecting terminal 21 and to the first circuit board 10, and the electrically high-frequency ground is formed. Therefore, the radiation gain of the first antenna 15 is assured. In this case, because the subjected frequency bands differ between the first antenna 15 and the second antenna 16, in principle, there is no electrical interference between both antennas.

However, for the second antenna 16 that is disposed in the vicinity of the first conductive section 12 and the second conductive section 13, because the first conductive section 12 and the second conductive section 13 overlap spatially, resulting in the interruption of the radiation from the antennas, the radiation gain decreases. In order to prevent this and in order to assure the radiation gain of the second antenna 16, the position at which the second antenna 16 is disposed can be changed. However, because size reduction is required for the mobile phone 1, it is difficult to use this means. In this way, because the plurality of antennas having varying frequency bands are disposed inside the housing 1C of the mobile phone 1, for which the size reduction is required, it is difficult to assure the radiation gain of the first antenna 15 and at the same time, to assure the radiation gain of the second antenna 16.

In order to correctly cause the first antenna 16 to radiate, resulting from the first conductive section 12 and the second conductive section 13, which are provided in the vicinity of the hinge mechanism 9, the radiation of the second antenna 16 is interrupted. Here, originally, the first conductive section 12 and the second conductive section 13 are provided in order to improve the radiation of the first frequency band (in the present embodiment, 800 MHz band), which is primarily subjected by the first antenna 15. Therefore, for the antenna current that flows into the first conductive section 12 and the second conductive section 13, as long as only the first frequency band is flowing, the radiation gain of the first antenna 15 can be assured. On the other hand, observing from the second antenna 16, the second frequency band (1.5 GHz band in the present embodiment) only may not be interrupted.

Therefore, in the present embodiment, when the conductive sections that are provided in the vicinity of the hinge mechanism 9, that is, in the vicinity of the second antenna 16 are connected to the reference potential line of the circuit board, a filter that passes the first frequency band and that prevents the passage of the second frequency band from passing is used. As a result, the radiation characteristics of the first antenna 15 that subjects the first frequency band are improved and at the same time, the radiation of the second antenna 16 that subjects the second frequency band reduces interruptions from the conductive sections to assure each of the first antenna 15 and the second antenna 16 of satisfactory radiation gains (radiation characteristics).

Figure 4:
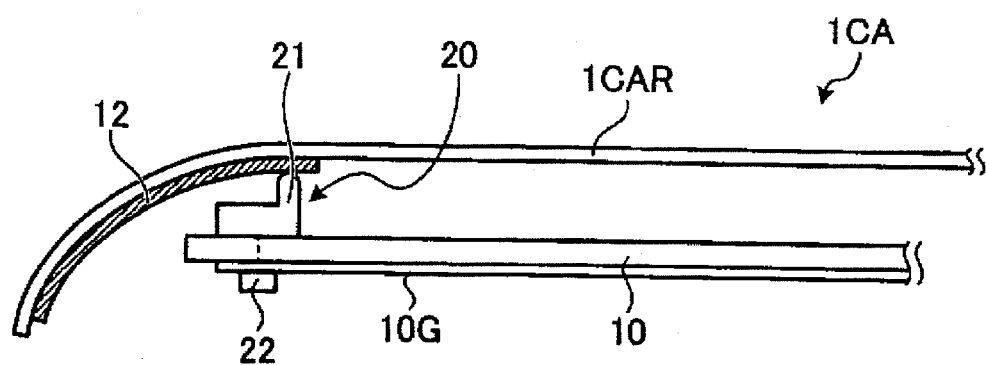
FIG. 4 is an enlarged view of the vicinity of the hinge mechanism of the first housing.
Figure 5:
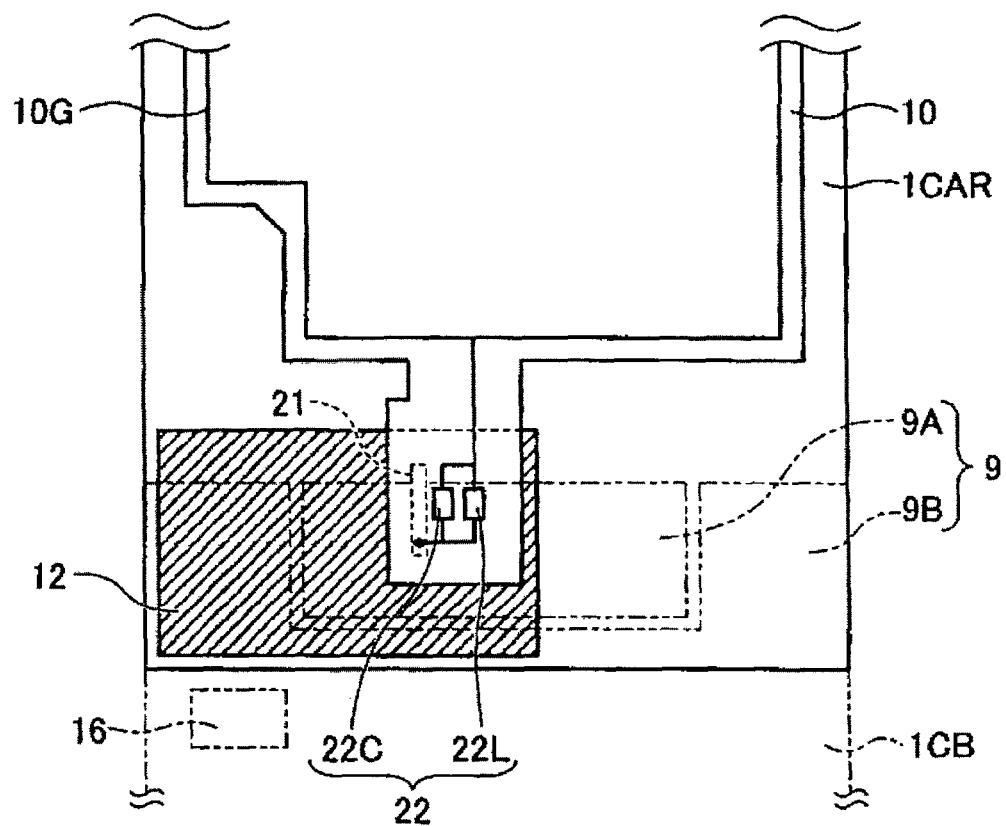
FIG. 5 is a plan view showing the connection of the conductive section that is provided to the first housing and the circuit board that is disposed inside the first housing.
Figure 6:
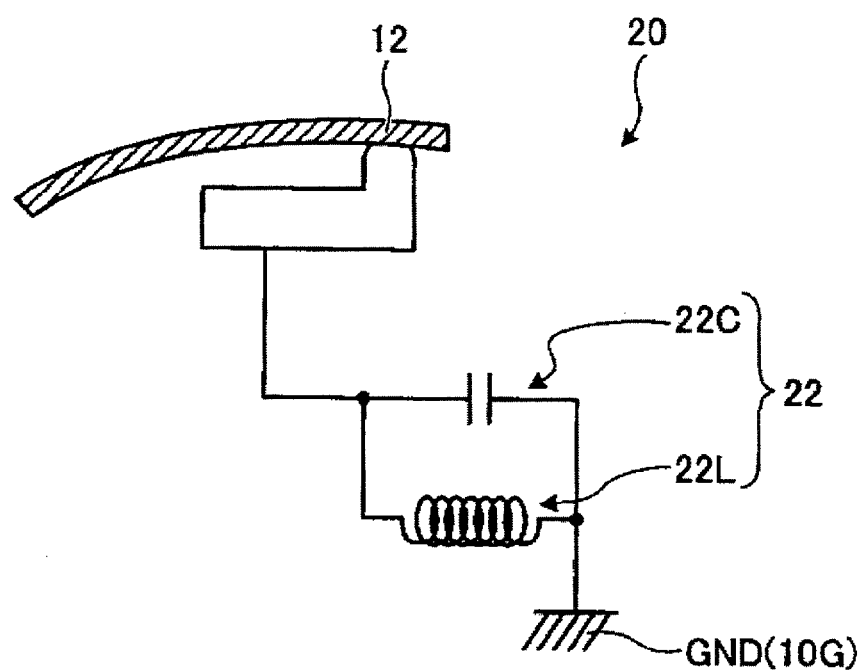
FIG. 6 is a diagram showing a circuit of the filter in the mobile phone according to the present embodiment.
Figure 7:
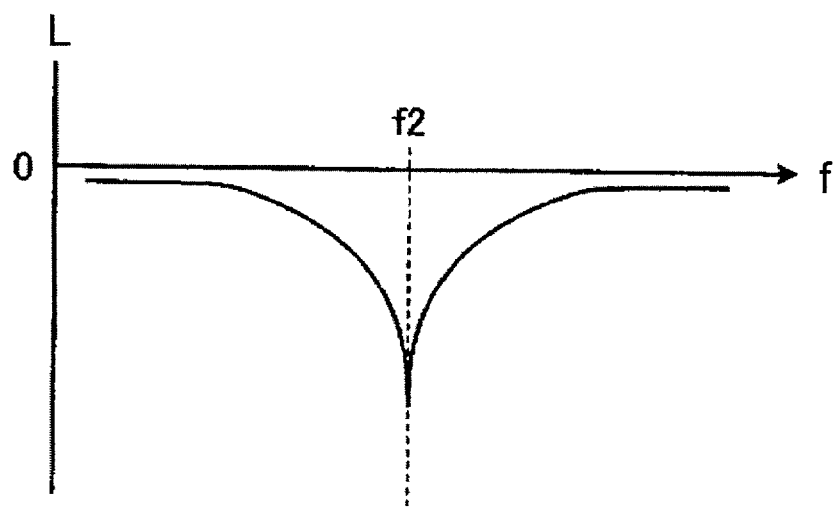
FIG. 7 is a schematic diagram showing the frequency characteristics of the filter that the mobile phone comprises according to the present embodiment.

FIG. 4 is an enlarged view of the vicinity of the hinge mechanism of the first housing. FIG. 5 is a plan view showing the connection structure of the conductive section that is provided to the first housing and the circuit board that is disposed inside the first housing. FIG. 5 shows the state viewed from the side of the first circuit board 10 that is provided inside the first housing 1CA. FIG. 6 is a circuit diagram of the filter that the mobile phone according to the present embodiment comprises. FIG. 7 is a schematic diagram showing the frequency characteristics of the filter that the mobile phone according to the present embodiment comprises. As shown in FIGS. 4 and 5, in the present embodiment, resulting from a reference potential connection structure 20, the first conductive section 12 that is provided to the back housing 1CAR of the first housing 1CA and a reference potential line 10G of the first circuit board 10 are connected. Next, the configuration of the reference potential connection structure 20 is described.

The reference potential connection structure 20 includes a connecting terminal 21 that comes in touch with the first conductive section 12, and a filter 22 (first filter) that is located between the connecting terminal 21 and the reference potential line 10G of the first circuit board 10, and that interferes more with the passage of the second frequency band than with the passage of the first frequency band. In the present embodiment, the connecting terminal 21 is attached to the first conductive section 12 side of the first circuit board 10, is located in the vicinity of the hinge mechanism 9 that is constituted from a first hinge section 9A and a second hinge section 9B, and comes into contact with the first conductive section 12 that is provided to the back housing 1CAR. On the other hand, the reference potential line 10G is formed on the front surface of the first circuit board 10 on the opposite side from the first conductive section 12. Therefore, for example, through a through-hole that is provided to the first circuit board 10, the connecting terminal 21 and the filter 22 are connected.

As shown in FIG. 5 and in FIG. 6, the filter 22 that constitutes the reference potential connection structure 20 comprises at least a capacitor element 22C that is connected in series between the connecting terminal 21 and the reference potential line 10G. In the present embodiment, the filter 22 further comprises a coil element 22L that is connected in parallel with the capacitor element 22C. FIG. 7 shows a relationship between a frequency f of the electric waves (electromagnetic waves) that pass through the filter 22 and a passage loss L. As shown in FIG. 7, the filter 22 has the (impedance) frequency characteristics that the passage loss L becomes larger as the frequency of the electric waves that pass through approaches f2. Therefore, the filter 22 is a filter comprising a function that interrupts the passage of the electric waves in specific frequency bands.

If the frequency f2 becomes the centre frequency of the second frequency band by adjusting the capacitance of the capacitor element 22C or the inductance of the coil element 22L that constitute the filter 22, the passage of the high-frequency current that corresponds to the electric waves of the second frequency band that is subjected by the second antenna 16 is interrupted by the filter 22. Therefore, since the high-frequency current that corresponds to the electric waves of the capacitance frequency bands is interrupted because the passage between the first conductive section 12 and the reference potential line 10G of the first circuit board 10 is interrupted, the decrease in the radiation gain of the second antenna 16 that subjects the second frequency band is controlled. On the other hand, the filter 22 basically causes the first frequency band to pass through. However, to be exact, because it is slightly interrupted, in other words, because the first frequency band is passed through more efficiently than the second frequency band, the high-frequency current that corresponds to the electric waves of the first frequency band passes through the filter 22 and flows between the first conductive section 12 and the reference potential line 10G of the first circuit board 10.

The first conductive section 12 that is provided in order to improve the radiation of the first antenna 15 serves the role of shielding to interrupt the radiation of the second antenna 16 if it is directly connected to the reference potential line 10G of the first circuit board 10. However, when the first conductive section 12 and the reference potential line 10G of the first circuit board 10 are connected through the allowed filter 22 which interrupts the passage of the second frequency band but allows the passage of the first frequency band, the first conductive section 12 falls to the reference potential for the first frequency band, but the first conductive section 12 does not fall to the reference potential for the second frequency band. Therefore, in the present embodiment, because the reference potential connection structure 20 functions as the antenna current path that causes all except for the second frequency band to pass through, the radiation of the first antenna 15 is improved and at the same time, the interruption of the radiation of the second antenna 16 is controlled. As a result, the mobile phone 1 comprising the first antenna 15 that corresponds to the first frequency band and the second antenna 16 that corresponds to the second frequency band can obtain the favorable radiation gain (radiation characteristics) both for the first antenna 15 and for the second antenna 16.

Moreover, for cases in which the conductive section that is provided in the vicinity of the hinge mechanism 9 is directly connected to the reference potential line of the first circuit board 10, it was necessary to reduce the range of the conductive section to the extent that the antenna radiation of the second antenna 16 is not interrupted and to examine the trade-off between the radiation characteristics of the first antenna 15 and the radiation characteristics of the second antenna 16. However, if the reference potential connection structure 20 according to the present embodiment is used, the radiation gain of the second antenna 16 can be assured; therefore, even if the conductive sections are provided so as to approach the second antenna 16, the effect on the antenna radiation of the second antenna 16 is kept minimal. Therefore, it becomes easy to draw out both the performance of the first antenna 15 and the performance of the second antenna 16. Moreover, while the structure in which the conductive section is provided in the vicinity of the hinge mechanism 9 is maintained, if the simple reference potential connection structure 20 is simply added, satisfactory radiation gain (radiation characteristics) can be obtained with respect to both the first antenna 15 and the second antenna 16.

In the present embodiment, the reference potential connection structure 20 was provided between the first conductive section 12, which is the conductive section on the first housing 1CA side, and the reference potential line 10G of the first circuit board 10; however, the reference potential connection structure 20 may be provided between the second conductive section 13, which is the conductive section on the second housing 1CB side, and the reference potential line of the second circuit board 11. That is, the reference potential connection structure 20 may be provided either between the first conductive section 12 and the reference potential line 10G of the first the circuit board 10, or between the second conductive section 13 and the reference potential line of the second circuit board 11. Moreover, as shown in the present embodiment, for cases in which the second antenna 16 is provided in the vicinity of the hinge mechanism 9 and inside the second housing 1CB, the effect of the first conductive section 12, which is the conductive section on the first housing 1CA side, on the radiation gain of the second antenna 16 is substantial. Therefore, in the present embodiment, the reference potential connection structure 20 is provided between the first conductive section 12, which is the conductive section on the first housing 1CA side, and the reference potential line 10G of the first circuit board 10. In this way, compared to cases in which the reference potential connection structure 20 is provided on the second housing 1CB side, the radiation gain of the second antenna 16 can be more effectively assured.

Modified Example 1

Figure 8:
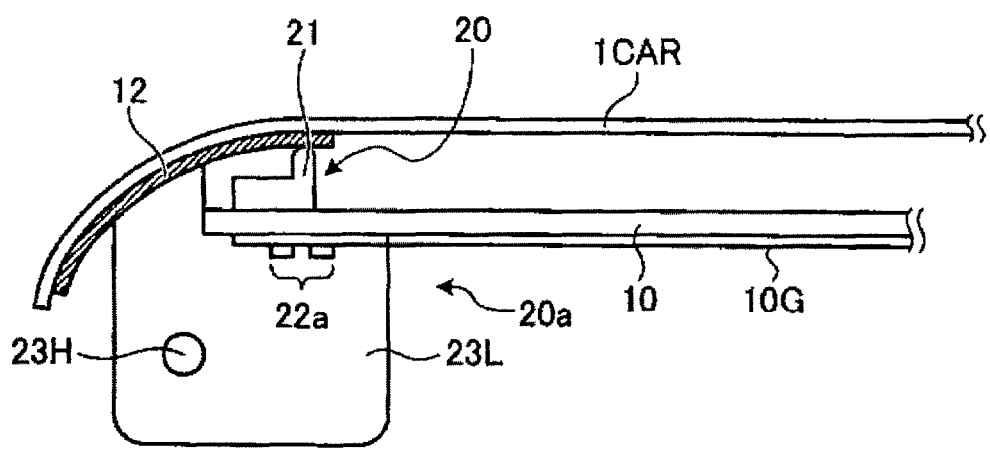
FIG. 8 is a side view showing the reference potential connection structure according to a modified example 1 of the present embodiment.
Figure 9:
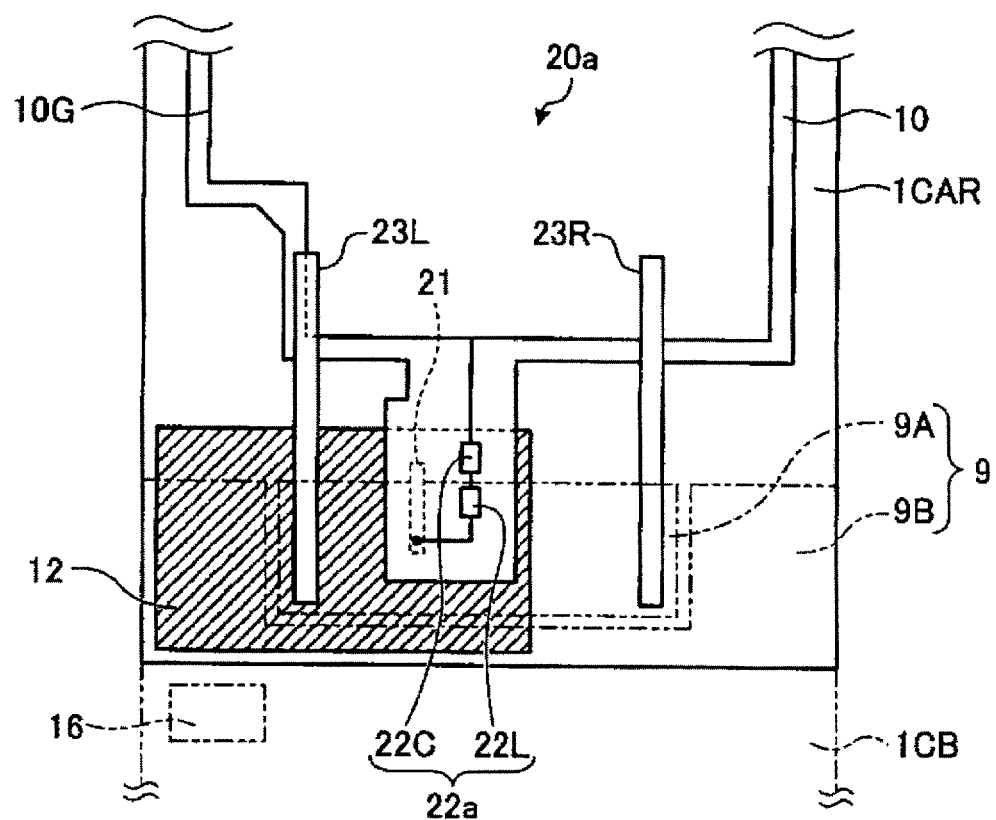
FIG. 9 is a plan view showing the reference potential connection structure according to the modified example 1 of the present embodiment.
Figure 10:
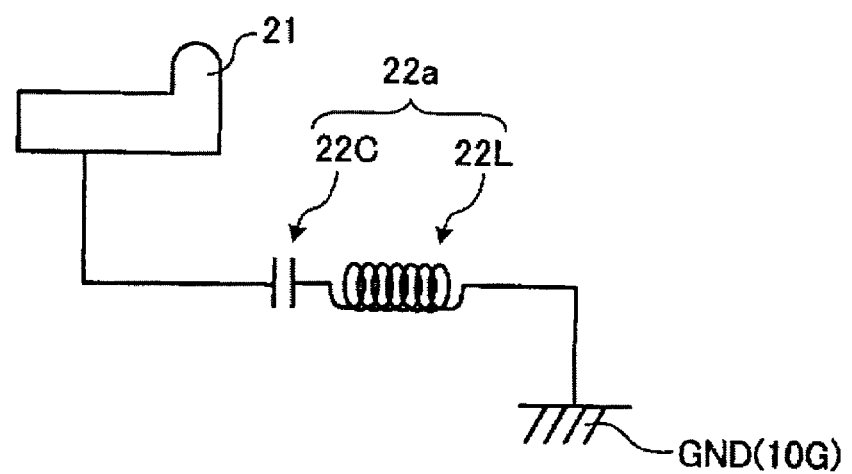
FIG. 10 is a diagram showing a circuit of the filter that the reference potential connection structure according to the modified example 1 of the present embodiment comprises.
Figure 11:
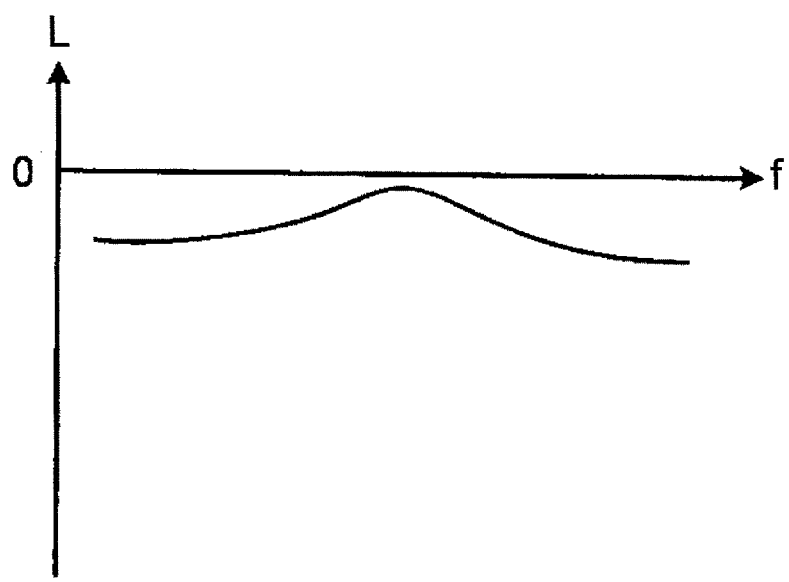
FIG. 11 is a schematic diagram showing the frequency characteristics of a single filter shown in FIG. 10.
Figure 12:
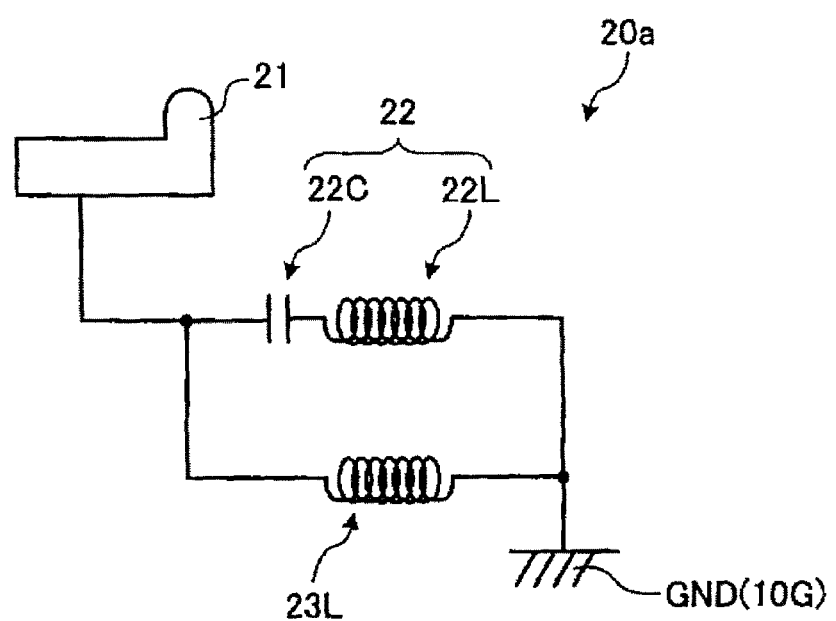
FIG. 12 is a diagram showing a circuit of the overall reference potential connection structure according to the modified example 1 of the present embodiment.

FIG. 8 is a side view showing the reference potential connection structure according to a modified example 1 of the present embodiment. FIG. 9 is a plan view showing the reference potential connection structure according to the modified example 1 of the present embodiment. FIG. 9 shows the state viewed from the side of the first the circuit board 10 that is provided inside the first housing 1CA. FIG. 10 is a circuit diagram of the filter that the reference potential connection structure according to the modified example 1 of the present embodiment comprises. FIG. 11 is a schematic diagram showing the frequency characteristics of a single filter shown in FIG. 10. FIG. 12 is an overall circuit diagram of the reference potential connection structure according to the modified example 1 of the present embodiment.

A reference potential connection structure 20a according to the present modified example 1 is generally the same as the reference potential connection structure 20 according to the above embodiment; however, it is different in that a connecting member 23L having conductivity is provided to the hinge mechanism 9, which is a connecting section, and it is different in that by utilizing this connecting member 23L, an equivalent circuit for the filter 22 that constitutes the reference potential connection structure 20 according to the above embodiment is formed. All other structure is the same as the above embodiment. As shown in FIG. 9, to the hinge mechanism 9, the connecting members 23L and 23R are provided. The connecting members 23L and 23R are constituted from metals, and they are attached inside the first housing 1CA shown in FIG. 3. The connecting members 23L and 23R connect the first hinge section 9A and the second hinge section 9B that constitute the hinge mechanism 9 and at the same time, as shown in FIG. 8 and in FIG. 9, support the first circuit board 10. A hole 23H is formed throughout the connecting member 23L (the same applies to the connecting member 23R); for example, a penetrating component such as a bolt is inserted into the hole 23H from the second hinge section 9B to penetrate the connecting member 23L, and therefore, the first hinge section 9A and the second hinge section 9B are connected.

Because the connecting members 23L and 23R are constituted from metals, they are conductive. Among these, the connecting member 23L, as shown in FIG. 8 and FIG. 9, comes in touch with the first conductive section 12, one portion of which is provided to the back housing 1CAR, and another portion of which comes in touch with the reference potential line 10G of the first the circuit board 10 at the different location from the one portion thereof. Therefore, the connecting member 23L is electrically connected to the first conductive section 12 and the reference potential line 10G. That is, the first conductive section 12 and the reference potential line 10G are electrically connected by the connecting member 23L.

The reference potential connection structure 20a comprises the connecting terminal 21 that comes in touch with the first conductive section 12; a filter 22a that is provided between the connecting terminal 21 and the reference potential line 10G of the first circuit board 10; and the connecting member 23L. In the present embodiment, the connecting terminal 21 is attached to the side of the first conductive section 12 of the first circuit board 10 and comes in touch with the first conductive section 12 that is provided to the back housing 1CAR. Similar to the above described embodiment, for example, the connecting terminal 21 and the filter 22a are connected through the through-hole provided to the first circuit board 10.

As shown in FIGS. 9 and 10, the filter 22a that constitutes the reference potential connection structure 20a comprises at least the capacitor element 22C that is connected in series between the connecting terminal 21 and the reference potential line 10G. In the present modified example 1, the filter 22a further comprises the coil element 22L that is connected in series to the capacitor element 22C. FIG. 11 shows a relationship between the frequency f of the electric waves (electromagnetic waves) that pass through the filter 22a and the passage loss L thereof. As shown in FIG. 11, the filter 22a is what is termed a band pass filter that causes the electric waves of a certain frequency band to pass through. If the filter 22a is used as is, the filter 22a may allow the second frequency band pass through.

In the present embodiment, resulting from the connecting member 23L, the first conductive section 12 and the reference potential line 10G are electrically connected. That is, the connecting member 23L is connected in parallel to the capacitor element 22C that constitutes the filter 22a. In the present modified example 1, in the filter 22a, the capacitor element 22C and the coil element 22L are connected in series, and in the connecting member 23L, the capacitor element 22C and the coil element 22L are connected in parallel. The reference potential connection structure 20a that is constituted in this way, as shown in FIG. 12, forms the equivalent circuit of the filter 22 (refer to FIG. 6) that constitutes the above reference potential connection structure 20. Therefore, the frequency characteristics of the reference potential connection structure 20a is similar to the frequency characteristics of the filter 22 according to the above embodiment (refer to FIG. 7), and the reference potential connection structure 20a functions as a filter that interrupts the passage of the electric waves in specific frequency bands.

If the frequency f2 is at the centre frequency of the second frequency band as shown in FIG. 7 by adjusting the capacitance of the capacitor element 22C that constitutes the reference potential connection structure 20a, the passage of the high-frequency current that corresponds to the electric waves of the second frequency band that is subjected by the second antenna 16 is interrupted by the filter 22. Therefore, for the electric waves of the second frequency band, because the passage between the first conductive section 12 and the reference potential line 10G of the first circuit board 10 is interrupted, the decrease in the radiation gain of the second antenna 16 that subjects the second frequency band is controlled. On the other hand, the filter 22 causes the first frequency band to pass through more efficiently than the second frequency band; therefore, the high-frequency current that corresponds to the electric waves of the first frequency band passes through the filter 22 and flows between the first conductive section 12 and the reference potential line 100 of the first circuit board 10. As a result, even in the present modified example 1, similar to the above described embodiment, the mobile phone 1 comprising the first antenna 15 that corresponds to the first frequency band and the second antenna 16 that corresponds to the second frequency band, can obtain favorable radiation gain (radiation characteristics) with respect to both the first antenna 15 and the second antenna 16.

For the reference potential connection structure 20a, between the first conductive section 12 and the reference potential line 10G, the capacitor element 22C and the connecting member 23L may be connected in parallel. In this case, because it is difficult to adjust the inductance of the connecting member 23L, for cases in which the frequency characteristics of the reference potential connection structure 20a are adjusted, only the capacitance of the capacitor element 22C is adjusted. However, as shown in FIG. 12, it is preferable that between the first conductive section 12 and the reference potential line 10G, the capacitor element 22C and the coil element 22L that are directly connected in series and the connecting member 23L are connected in parallel. This is because by adjusting the capacitance of the capacitor element 22C and the inductance of the coil element 22L that is connected in series to the capacitor element 22C, the frequency characteristics of the reference potential connection structure 20a can be adjusted in more detail.

As above, in the present embodiment and the modified example 1 thereof, the conductive sections that are provided to the connecting section of the plurality of housings and that cause the high-frequency current to be transmitted between the reference potential lines of the circuit boards that are disposed inside the respective housings; and a filter that interrupts the passage of the second frequency band, rather than the first frequency band, between these conductive sections and the reference potential lines, are provided. With this filter, for the high-frequency current that corresponds to the electric waves of the second frequency band, because the passage between the conductive section and the reference potential line of the circuit board is interrupted, the decrease in the antenna radiation gain that subjects the second frequency band is controlled. On the other hand, because the high-frequency current that corresponds to the electric waves of the first frequency band passes through the filter and flows between the conductive section and the reference potential line of the circuit board, the antenna that subjects the first frequency band obtains the favorable radiation gain.

In this way, in the present embodiment and the modified example 1 thereof, in the wireless terminal device having antennas that correspond to varying frequency bands, even though the antenna that corresponds to the second frequency band must be provided in the vicinity of the conductive section, each antenna can obtain favorable radiation characteristics. In general, because size reduction is required for the wireless terminal device, there are restrictions with regard to the disposition of electrical and electronic devices on board; however, the configuration according to the present embodiment and the modified example 1 thereof is especially effective to these types of wireless terminal devices.

Moreover, by setting the first frequency band to 800 MHz band, which is the frequency band of mobile phones and by setting the second frequency band to 1.5 GHz band, which is the carrier frequency band of the GPS signals, both the functions as the mobile phones and the functions such as navigations using the GPS can be established more reliably. Moreover, by using the antenna for the first frequency band as the transmitting and receiving antenna that is used for the wireless communications and by using the antenna for the second frequency band as the GPS antenna that is used for the GPS reception, the wireless terminal device that can more reliably establish both communication and navigation using the GPS, etc., can be provided.

Modified Example 2

Figure 13:
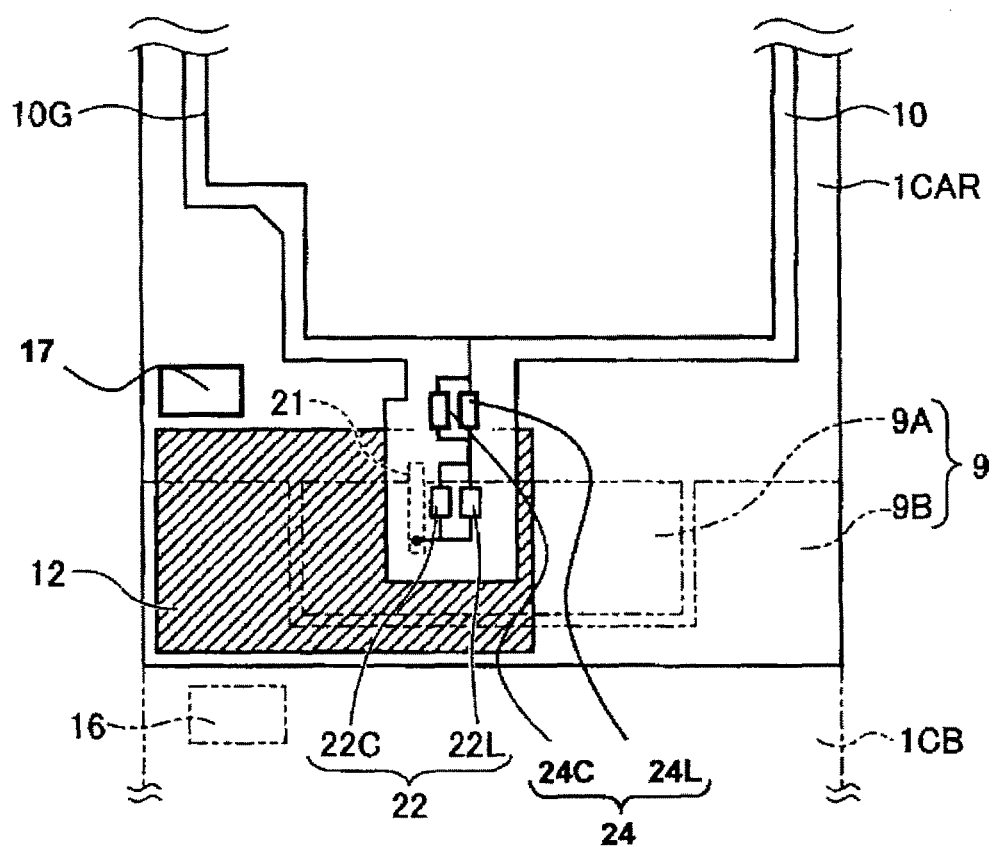
FIG. 13 is a plan view showing the connection structure of the conductive section and the circuit board according to the modified example 2 of the present embodiment.

Next, a modified example 2 of the present embodiment is explained. FIG. 13 is a plan view according to the modified example 2 of the present embodiment, and shows the connection structure of the conductive section that is provided to the first housing and the circuit board that is disposed inside the first housing. Moreover, because FIG. 13 is basically common with the embodiment shown in FIG. 5, explanation for the common sections is omitted. Moreover, the modified example 2 shown in FIG. 13, compared to the example shown in FIG. 5, is different in the aspect, in which the modified example 2 comprises a third antenna 17 of a third frequency band and the aspect, in which a filter 24 (the second filter) is also inserted.

Moreover, between the first conductive section 12 that is provided to the back housing 1CAR of the first housing 1CA and the reference potential line 10G of the first circuit board 10, in addition to the filter 22, the filter 24 is inserted in series. Furthermore, the circuit that is connected through the filter 22 and the filter 24, from the reference potential line 10G to the first conductive section 12 is shown as the equivalent circuit in FIG. 14.

Figure 14:
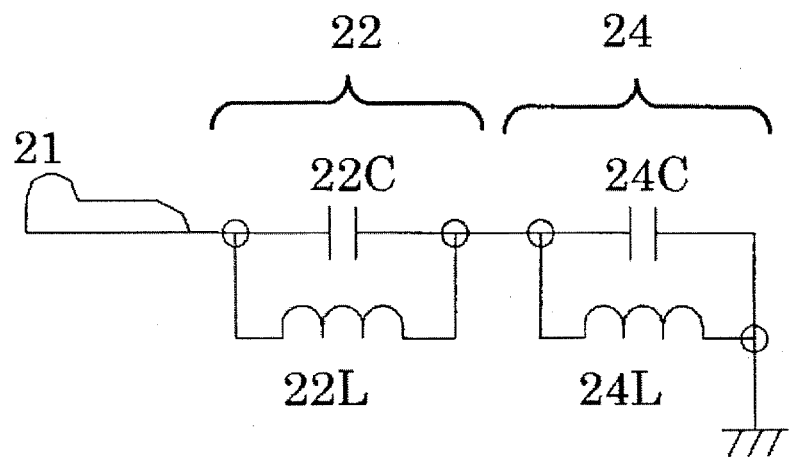
FIG. 14 is a diagram showing a circuit of the filter in the mobile phone according to the modified example 2 of the present embodiment.
Figure 15:
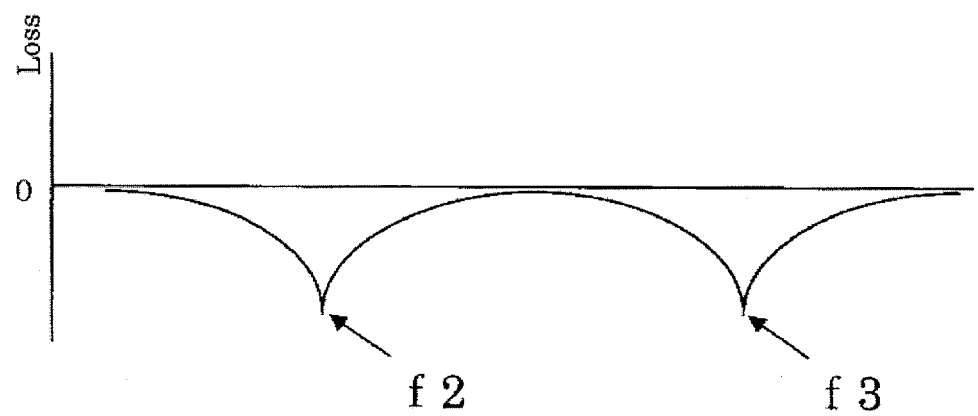
FIG. 15 is a schematic diagram showing the frequency characteristics of the filter that the mobile phone according to the modified example 2 of the present embodiment comprises.

As shown in FIG. 13 and FIG. 14, the filter 24 comprises a capacitor element 24C that is connected in series between the filter 22 and the reference potential line 10G; and a coil element 24L that is connected in parallel to the capacitor element 24C. FIG. 15 shows a relationship between the frequency of the electric waves (electromagnetic waves) that pass through the filter 22 and the filter 24 and the passage loss L thereof. As shown in FIG. 15, according to the structure of the modified example 2, similar to the case with the filter 22 only, the structure results in the frequency characteristics in which as the frequency of the electric waves that pass through approaches the f2, the passage loss L becomes larger. In addition the structure results in the frequency characteristics in which at the vicinity of a frequency f3, the passage loss L also becomes larger. Therefore, the filter 24 is a filter that is constituted so as to comprise functions to interrupt the passage of the electric waves for the frequency f3. However, because slight movement occurs in the frequency characteristics, resulting from the series connection to the filter 22, for the modified example 2, it is obvious that the value observed in a comprehensive manner with respect to at least the filter 22 and the filter 24 is necessary to be set.

Here, the third antenna 17 is an antenna for performing communications with the third frequency band that is different from the first and the second frequency band that are described in the prior embodiment and the modified example 1. Moreover, for the frequency band that is attenuated, resulting from the filters 22 and 24, the values for the respective element of the filters are set such that the band frequency used for the second antenna 16 is at the frequency f2 and the band frequency used for the third antenna 17 is at the frequency f3.

Specifically, for example, for cases in which the second antenna 16 is used as the antenna for the reception of the GPS, being 1.5 GHz, and in which the third antenna 17 is used as the antenna used for communications of a Bluetooth (trademark) 17 at 2.4 GHz band, the respective filters are designed such that the frequency f2 is at 1.5 GHz and the frequency f3 is at 2.4 GHz.

According to the modified example 2, by comprising the filter 22 and the filter 24, the passage of both the high-frequency current that corresponds to the electric waves of the second frequency band and the high-frequency current that corresponds to the electric waves of the third frequency band is also interrupted. That is, with regard to the two frequency bands, namely the frequencies f2 and f3, because the conductive coating (first conductive section 12) becomes high impedance, it is possible to prevent not only the antenna radiation from the second antenna 16, but also the antenna radiation from the third antenna 17 from being interrupted, and both radiation from the second antenna 16 and the third antenna 17 can be more effectively.

That is, even if the second antenna 16 is used as a GPS antenna and the third antenna 17 is used as a Bluetooth antenna, adverse effects regarding receiving and transmitting those are avoided as much as possible, and at the same time, the antenna gain of the first antenna can be improved.

Modified Embodiment 3

Figure 16:
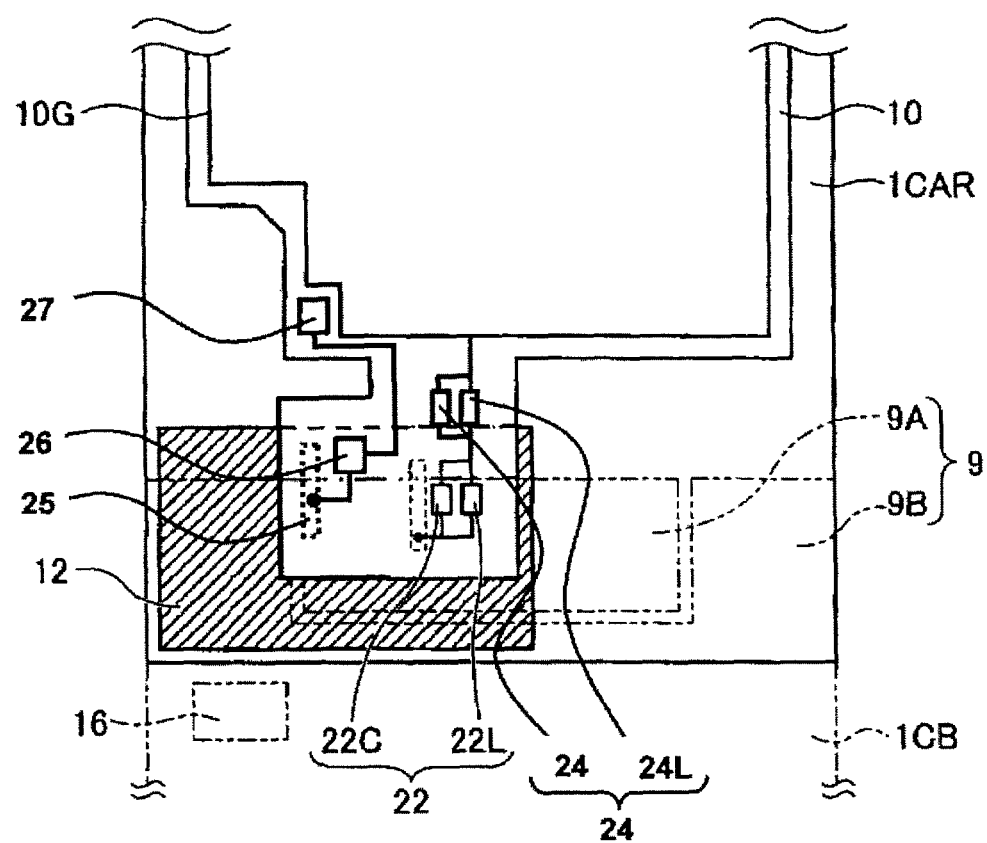
FIG. 16 is a plan view showing a connection structure of the conductive section and the circuit board according to the modified example 3 of the present embodiment.

Furthermore, as one example of the communication device (communication section) for the third frequency band, an example for cases having a Bluetooth device is explained as a modified example 3 of the present embodiment. In FIG. 16, as the modified example 3 of the present embodiment, a plan view of an example comprising a feed terminal 25, a matching circuit 26, and a Bluetooth device 27 is shown. Furthermore, explanation for the sections having the common symbols is omitted for FIG. 16. In this example, while the reference potential line 10G of the first circuit board 10 is connected to the first conductive section 12 through the filter 22 and the filter 24, in the similar manner as the modified example 2, the current is supplied to the first conductive section 12, through the matching circuit 26 and the feed terminal 25, from the Bluetooth device 27 on the first circuit board 10.

Figure 17:
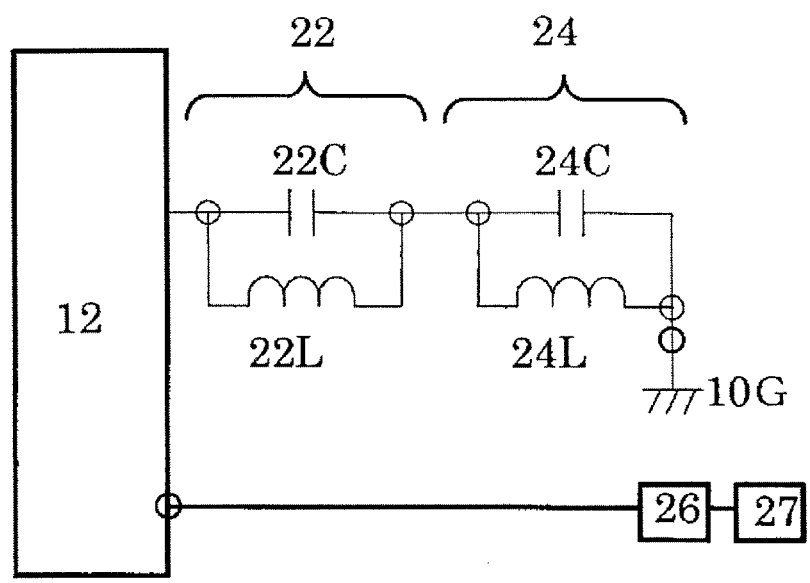
FIG. 17 is a plan view showing an equivalent circuit of the conductive section and the circuit board according to the modified example 3 of the present embodiment.
Figure 18:
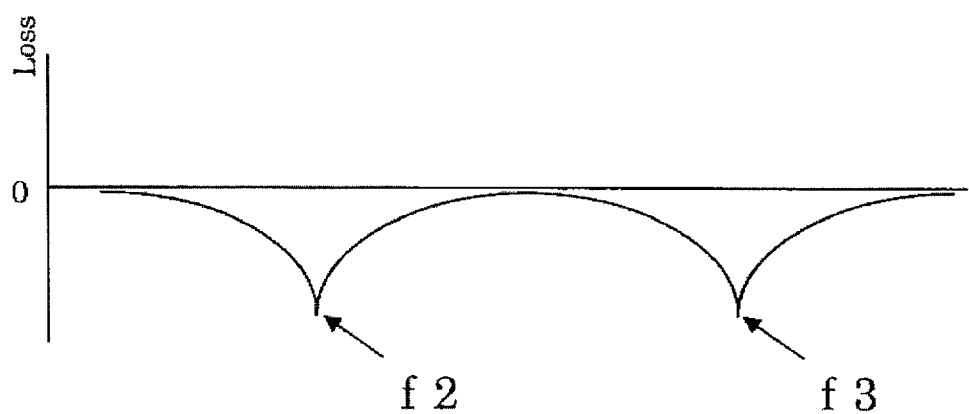
FIG. 18 is a schematic diagram showing the frequency characteristics of the filter that the mobile phone according to the modified example 3 of the present embodiment comprises.

In the modified example 3, similar to the modified example 2, while the connection between the first conductive section 12 and the reference potential line 10G is isolated at a certain frequency band (as an example, at a Bluetooth band), and by supplying to the first conductive section 12 side at separate sections, antennas for the frequency bands in which isolation is provided can be constituted. The circuit diagram has the structure shown in FIG. 17, and as the passage characteristics thereof, it has the characteristics shown in FIG. 18.

Therefore, while causing the frequency band used for the first antenna 15 to pass through, the antenna radiation of the frequency band that is used for the second antenna 16 is improved, and it is possible for the first conductive section 12 to obtain antennas for communication devices of the third frequency band without adding other antenna members. Specifically, for example, as with the cases in which, while the antenna characteristics at the 800 MHz band are improved and adverse effects on the radiation characteristics of the GPS antenna are prevented at the same time, the Bluetooth antennas are obtained, according to the present modified example 3, it also becomes possible to achieve all objectives, namely the size reduction, the improvement of the antenna characteristics, and the reduction in the number of components.

As above, the plurality of embodiments has been explained; however, as necessary, it may be carried out by combining those respectively and accordingly.

INDUSTRIAL APPLICABILITY

As above, the wireless terminal device according to the present invention is effective for the wireless terminal device comprising at least antennas with two frequency bands.

The invention claimed is:
1. A wireless terminal device comprising:
circuit boards disposed inside a plurality of housings, respectively;
a connecting section connecting the plurality of housings;
conductive sections located on the inner side of the respective housings at the connecting section, and transmitting high-frequency current;
a first antenna for a first frequency band, the first antenna disposed on the opposite side of the connecting section on an circuit board;
a second antenna for a second frequency band, the second antenna disposed on the connecting section side on the circuit board;
a connecting terminal that is disposed on the connecting section side and that comes in touch with the conductive section;
a first filter that is located between the connecting terminal and the reference potential line of the circuit boards and that interferes with a passage of the second frequency band, the first filter comprising at least a capacitor element that is connected in series between the connecting terminal and the reference potential line.

2. The wireless terminal device according to claim 1, wherein the first filter comprises a coil element that is connected in parallel to the capacitor element.

3. The wireless terminal device according to claim 1, wherein connecting members having conductivity are provided to the connecting section, the connecting members come in touch with the conductive sections, and the connecting members are connected in parallel to the capacitor element.

4. The wireless terminal device according to claim 3, further comprising a coil element connected in series to the capacitor element.

5. The wireless terminal device according to claim 1, wherein the second antenna is provided to the circuit board that is disposed inside the housing to which an operation means is provided, among the plurality of housings.

6. The wireless terminal device according to claim 1, wherein the first frequency band is 800 MHz band, and the second frequency band is 1.5 GHz band.

7. The wireless terminal device according to claim 1, wherein the first antenna serves as a transmitting and receiving antenna that is used for wireless communications and the second antenna serves as a GPS antenna that is used for reception of the GPS.

8. The wireless terminal device according to claim 1, wherein the first filter interferes with the passage of the second frequency band more than with the first frequency band.

9. The wireless terminal device according to claim 1, further comprising a third antenna for a third frequency band different from the first frequency band and the second frequency, wherein a second filter that is connected in series to the first filter between the connecting terminal and the reference potential line of the circuit boards and that interferes with the passage of the third frequency band is provided.

10. The wireless terminal device according to claim 1 further comprising:
 a second filter that is connected in series to the first filter between the connecting terminal and the reference potential line of the circuit boards, and that interferes with the passage of the third frequency band; and
 a communication section that feeds signals of the third frequency to the conductive sections.

11. The wireless terminal device according to claim 1, wherein the first filter is disposed in at least one of the plurality of housings.

12. The wireless terminal device according to claim 1, wherein the first filter is disposed in one of the plurality of housing in which the second antenna is not disposed.

* * * * *